Patented Mar. 30, 1937

2,075,376

UNITED STATES PATENT OFFICE 2,075,376

RESINOUS COMPOSITION

Richard T. Ubben, Wilmington, Del., assignor to E. I. du Pont de Nemours & Company, Wilmington, Del., a corporation of Delaware No Drawing. Application May 1, 1935,
Serial No. 19,303

3 Claims. (Cl. 134—26)

This invention relates to coating and plastic compositions and to methods for their preparation. It relates more particularly to ethyl cellulose lacquers containing selected types of phenol-aldehyde resins.

Cellulose nitrate is known to be unique among cellulose derivatives in being capable of formulation into lacquers of great beauty and durability (see U. S. 1,710,453 and Re. 16,803). Such lacquers have been manufactured and sold on an exceedingly large scale in the past several years and have revolutionized finishing in many fields, such as the coating of automobile bodies. No other cellulose derivative lacquers have to my knowledge been shown to be equal in durability to cellulose nitrate lacquers.

In spite of this extensive use, the nitrate is not ideal for lacquers because of its inherently hazardous and chemically unstable nature, and because of the very careful and exact technique required for preparation of a nitrate of consistently uniform properties. Because of the greater chemical stability of ethers as compared to esters, the coating art would therefore greatly prefer to employ cellulose ethers in lacquer manufacture if they were available in unlimited quantity and consistent quality, and if it were known how to formulate them properly. Present indications are that the quantity and quality of ethyl cellulose will be satisfactory in the near future. Looking to this probability, I have tested a great many ethyl cellulose-resin compositions, but have found that the technique for formulating nitrate lacquers offers no guide whatever to the manufacture of durable ethyl cellulose compositions. As a result of my experiments, however, I am able to point to certain synthetic resins, namely, particular types of phenol-aldehyde resins, which, when used with ethyl cellulose, will result in coatings that in durability and color retention are equal or superior to the nitrocellulose lacquers now used extensively.

It is fully disclosed in the prior art that cellulose derivatives, both ethers and esters, may be blended with resins, both natural and synthetic. However, it is now recognized by experts that the coating art is so complex as not to permit random selection of any resin and any cellulose derivative if compositions are to be secured which meet or exceed modern high standards of durability, beauty, and color retention. For a given cellulose derivative and a given type of resin, the comparatively few outstanding compositions can be arrived at only through extensive and laborious research. Thus, from the broad premise of blending cellulose derivatives and resins, my new compositions could not be arrived at by simple test, nor could their surprising properties by any means be foretold.

It has also been disclosed in the art that phenol-aldehyde resins as a class may be compounded with ethyl cellulose. My own researches have largely confirmed this implication that the two are generally compatible, at least to some extent, if the resin is still fusible and soluble. However, for optimum compositions it is not enough that the resin be compatible with ethyl cellulose. The resin must be so selected that it cooperates with the ethyl cellulose to yield coatings having at least standard properties. The particular phenol-aldehyde resins which I have discovered to give the desired results have not to my knowledge been suggested heretofore for use in ethyl cellulose lacquers.

It is therefore an object of this invention to provide methods of formulating acceptable lacquers from the more chemically inert cellulose derivatives, in particular cellulose ethers such as ethyl cellulose. It is a further object of my invention to select from the known compatible resins those which will cooperate with the ethyl cellulose to give coatings of satisfactory durability and color retention. It is a still further object of the invention to select the particular phenol-aldehyde resins which will impart to the lacquer exceptional durability and color retention as compared to the great majority of such resins.

The above and other objects appearing hereinafter are accomplished by compounding the ethyl cellulose with phenol-aldehyde resins which are synthesized from a phenol having the following two elements of chemical structure: (1) two unoccupied reactive positions only and (2) a tertiary aliphatic carbon atom in another reactive position, preferably in the para position to all phenolic hydroxyls. By "reactive positions" is meant the ortho and para positions to phenolic hydroxyl. An example of a phenol fulfilling the above requirements is p-tertiary amyl phenol, which has the structural formula—

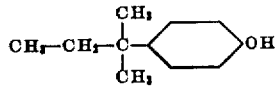

In the above formula, only two reactive positions, viz., the two ortho positions to the phenolic hydroxyl, are unoccupied. Likewise, the aliphatic tertiary carbon atom of the tertiary amyl radical is joined to the benzene ring in one of the reactive positions, namely, the para position. O-tertiary-amyl phenol also meets these structural requirements and may be used, though less satisfactorily, in this invention.

The first of the above structural requirements is based upon my discovery of the fact that durable ethyl cellulose phenol-aldehyde resin lacquers must contain a fully condensed resin which is at the same time soluble in organic solvents. If the phenol contains only one unoccupied reactive position it is not sufficiently reactive with formaldehyde to yield a resin of the proper degree of condensation. If there are more than two unoccupied reactive positions (as is the case with many polyhydric phenols), the phenol reacts with the formaldehyde so rapidly that the fully condensed resin is infusible, incompatible with ethyl cellulose, and insoluble in organic solvents. A resin of this character obviously cannot be used in ethyl cellulose lacquers.

The second of the above structural requirements is based upon my discovery that the character of ordinary ethyl cellulose places unique and rigid requirements upon the phenol-aldehyde resin which is to be used therewith in lacquer formulation. I have found that blends of clear, colorless solutions of most phenol-aldehyde resins with clear, colorless solutions of ethyl cellulose will gradually assume a cherry red and then a very dark brown color, while correspondingly tested blends of cellulose acetate or nitrate do not show this effect. Even exclusion of oxygen from the ethyl cellulose resin solution does not prevent color formation, and the removal of the color, once it has formed, is not possible. Such compositions are largely useless as lacquers because the solutions exhibit a very poor appearance and coatings obtained therefrom are correspondingly colored. I believe the coloring effect of ethyl cellulose on phenol-aldehyde resins to be due largely to traces of alkali which are present in the ethyl cellulose. Cellulose ethers are prepared by reacting cellulose with appropriate reagents in the presence of an excess of strong caustic, and as a result traces of alkali or alkaline salts which are exceedingly difficult to remove remain in the finished products. This is not true of cellulose acetate or nitrate which are nearly always neutral or slightly acidic since they are prepared in the presence of readily extractible acids. The removal of the trace of alkali from ethyl cellulose is difficult and impractical, and the addition of free acid to the ethyl cellulose resin lacquer inevitably produces accentuated corrosion effects by the lacquer. I have unexpectedly found that ethyl cellulose compositions containing phenol-aldehyde resins prepared from phenols of the mentioned structure are permanently color-stable. While I do not wish to be confined to theory, I believe the discoloration otherwise observed is due to a quinoid-like degradation of the resin molecules which is induced and catalyzed by traces of alkali. Theoretically this type of chemical change would not take place if the phenolic hydroxyls are blocked in one of the reactive positions, especially the para position, by tertiary carbon.

An additional requirement for suitable resins is that they be compatible with ethyl cellulose. This, however, is true of most soluble phenol-aldehyde resins, and can in any event be checked by simple test.

The actual formulation of my new lacquers may be carried out according to conventional methods and need not be discussed in detail. A solution of the properly selected resin in appropriate lacquer solvents, may, for example, be blended with a similar solution of ethyl cellulose. Suitable plasticizers are then added, followed by diluents, until the desired spraying viscosity is reached. The selection of the proper solvents and plasticizers, proportions of resin to ethyl cellulose, etc. will be apparent from the following examples, in which the parts are by weight.

*Example I*

| | Parts |
|---|---|
| Ethyl cellulose | 10 |
| p-Tertiary-amyl phenol-formaldehyde resin | 10 |
| Plasticizer (mixed phthalates of higher branched chain alcohols obtained by hydrogenation of carbon oxides) | 4 |
| Xylene | 36 |
| Ethyl alcohol | 20 |
| Petroleum hydrocarbons (B. P. 60–100° C.) | 20 |

The above lacquer, which is adjusted to a 14% nonvolatile content, was applied readily by spraying and smooth glossy films obtained upon evaporation of the solvents. These films over plain steel showed excellent adhesion and chemical resistance. For example, they were not affected after immersion for six days in 4% sodium chloride and 2% sodium hydroxide solutions. Before application the above lacquer has a pale amber color, which does not, however, darken appreciably on standing. Test panels of plain and undercoated steel also stained and filled mahogany wood, were coated with films of this lacquer 0.0018 inch thick, and exposed to the weather at an angle of 45° facing south. At the end of twelve months the film was still in excellent condition, showing no water spotting, no discoloration, and good gloss. There was no evidence of blistering, checking, or rusting. Test panels coated with compositions analogous to the above but containing ester gum, rosin, "Amberol" (rosin or rosin-lycerol modified phenol-formaldehyde resin), polyvinyl acetate, hydrogenated rosin, cyclohexanone-formaldehyde resin, and gilsonite in place of the p-tertiary-amyl phenol-formaldehyde resin, when exposed side by side with my compositions, showed extremely poor durability, failing completely after periods of from six to ten weeks. Damar, shellac and fatty oil modified polyhydric alcohol-polybasic acid resins are incompatible with ethyl cellulose and could not even be tested. Likewise, when the colorless resin obtained by reacting phenol itself with formaldehyde was substituted for the p-tertiary-amyl pheno-formaldehyde resin of the above example, the product showed bad discoloration on exposure to light, low water resistance, and very poor durability, failing after a few weeks.

While I prefer to employ in my invention resins from mononuclear monohydric phenols, I may also use to advantage resins made from those of the polynuclear polyhydric phenols whose structure also meets the two previous requirements set forth, viz.: two unsubstituted reactive positions only, and a tertiary carbon atom in one of the reactive positions. An example of a lacquer prepared from such a resin is as follows:

*Example II*

| | Parts |
|---|---|
| Ethyl cellulose | 10 |
| Formaldehyde-bis(3-methyl-4-hydroxy phenyl) dimethylmethane resin | 10 |
| Plasticizer (same as Example I) | 6 |
| Xylene | 36 |
| Ethyl alcohol | 19 |
| Low-boiling petroleum hydrocarbons (B. P. 60–100° C.) | 19 |

The above composition contains 13% solids and is adjusted to spraying viscosity. A higher solids content at spraying viscosity may be secured by using low-viscosity ethyl cellulose. Test panels covered with the above compositions were still in good condition after one year, retaining an excellent gloss and substantially their original color. Films before exposure were found to be highly resistant to water, dilute salts, and dilute alkali solutions, as evidenced by failure to peel from steel or wood panels immersed in such liquids for six days.

By inclusion of drying oils in my compositions I am enabled to prepare coatings, which from the standpoint of durability are also very valuable. The preparation of such an oil composition is given below:

Example III

| | Parts |
|---|---|
| Ethyl cellulose | 10.0 |
| p-Tertiary-amyl phenol-formaldehyde resin | 5.0 |
| Blown linseed oil | 3.0 |
| Plasticizer (same as Example I) | 2.0 |
| Xylene | 18.75 |
| Butyl alcohol | 12.5 |
| Low-boiling petroleum hydrocarbons (B. P. 60–120° C.) | 31.25 |

In the above example an ethyl cellulose of relatively low viscosity was used in order that a solution containing a relatively high solids content at spraying viscosity (20%) could be obtained. Before application, the lacquer had a pale yellow color, but this did not deepen on standing. Test panels coated with the lacquer showed excellent adhesion and water resistance. After outdoor exposure for one year, there was no evidence of discoloration, checking, or blistering over both plain and under-coated steel. Likewise, there was little or no loss of gloss. This is a coating composition which is distinctly superior to the analogous composition containing nitrocellulose in place of ethyl cellulose.

A disadvantage of cold-blended oil-resin-ethyl cellulose compositions such as that just given is that with some resins only limited amounts of oil can be introduced before the blend becomes turbid. This difficulty may be overcome by first heating together the oil and the resin in accordance with common varnish-making procedures. In such instances, however, the resin must be "oil soluble" in the varnish-maker's sense, or, in other words, capable of being hot-blended with the oil without becoming infusible and insoluble. While nearly all the phenol-aldehyde resins made from phenols having my two elements of chemical structure meet this requirement (possible exceptions are p-tertiary butyl and p-tertiary amyl phenols), those resins from the polynuclear polyhydric phenols are particularly desirable in this variation of my process. The following example illustrates the technique more exactly:

Example IV

A mixture of 20 parts of formaldehyde-bis-(3-methyl-4-hydroxyphenyl) dimethylmethane resin and 20 parts of purified linseed oil was heated and stirred at 150° C. for 5 minutes. The temperature was gradually increased to 210° C. during the following ten-minute period. Heating and stirring were then discontinued and the product allowed to cool to about 90–100° C., following which a mixture of 150 parts toluene, 100 parts ethyl alcohol, 50 parts xylene, and 20 parts butyl acetate was gradually introduced. The blended resin-oil composition dissolves readily in this solvent mixture. Twenty parts ethyl cellulose was then added, and the solution stirred until completely clear and homogeneous. The resulting blend had a very pale yellow color which, however, did not deepen on standing. When brushed, flowed, or sprayed onto a smooth surface, the lacquer thus prepared dried rapidly forming a smooth, glossy, colorless film. Test panels coated with this composition showed excellent gloss, water resistance, and general durability and showed no discoloration on exposure to sunlight. Compositions containing the same ingredients, in the same proportions, but which were not blended by heating show turbidity due to the incompatibility of the oil. It will be noted that in Example IV the oil constitutes 25% of the blended essential ingredients (resin, oil, and ethyl cellulose) whereas in Example III, a cold blend, the oil constitutes only 16.7% of these essential ingredients.

The excellent durability and resistance to discoloration of my new coatings are also obtained with pigmented compositions of which the following is an example:

Example V

| | Parts |
|---|---|
| Ethyl cellulose | 10.00 |
| p-Tertiary-amyl phenol-formaldehyde resin | 5.00 |
| Plasticizer (same as Example I) | 3.1 |
| Xylene | 42.00 |
| Ethyl alcohol | 20.00 |
| Petroleum hydrocarbons (B. P. 86–120° C.) | 39.00 |
| Zinc oxide (5% leaded) | 6.75 |

The above mixture was ground in a ball mill for 24 hours and then was thinned by addition of a solvent mixture consisting of 121 parts xylene, 61 parts ethyl alcohol, 61 parts petroleum hydrocarbons (B. P. 60–120° C.), 30 parts butyl acetate, and 30 parts butyl alcohol. The resulting composition was readily applied to test panels by means of pressure spraying and showed excellent hiding power and coverage. After outdoor exposure for one year over plain and undercoated steel, films of this enamel were still intact and showed no evidence of blistering, checking, cracking, or peeling. In this respect they were definitely superior to exactly analogous nitrocellulose compositions. Substitution of rosin, ester gum, "Amberol", polyvinyl acetate, hydrogenated rosin, "Albinalt" (a special asphalt), coumarone-indene resin, etc. for the p-tertiary-amyl phenol-formaldehyde resin also resulted in products which under identical exposure conditions failed in two to three months. Damar, shellac, and drying oil modified polyhydric alcohol-polybasic acid resins, being incompatible with ethyl cellulose, could not be tested.

A composition similar to that of Example V was prepared with titanium oxide as the pigment, exposed to the weather, and found to show less chalking and better general durability than an analogous composition containing nitrocellulose in place of ethyl cellulose. Other pigments, such as bone black, chrome orange, toluidine red, China blue, antimony oxide, etc., may be used with similar results. These enamels have a high build, excellent gloss, and great beauty. They are suitable for indoor or outdoor application, but especially the latter because of their outstanding durability. They adhere well, provided the surface is clean, to many types of materials, such as metal, wood, glass, etc.

In a few instances, as in the case of dark colored and black paints and enamels, and in the case of varnishes for dark surfaces, color stability is not a requirement of prime importance. In such instances ethyl cellulose lacquers of fair durability may be formulated with resins prepared from polynuclear phenols which do not have tertiary aliphatic carbon in the para position to phenolic hydroxyl. The phenol, however, should still have two (not one or more than two) unsubstituted reactive positions, that is, positions ortho or para to phenolic hydroxyl. The preparation of a durable lacquer from ethyl cellulose and this type of phenol-aldehyde resin is illustrated in the following example:

Example VI

| | Parts |
|---|---|
| Ethyl cellulose | 10 |
| p-Phenyl phenol-formaldehyde resin | 5 |
| Plasticizer (same as Example I) | 3 |
| Butyl acetate | 50 |
| Toluene | 25 |
| Ethyl alcohol | 6 |
| Ethyl acetate | 6 |

The above composition has a pale yellow color. Films obtained by evaporation of the solvent dry rapidly to a tack-free, smooth surface. When cast over plain or undercoated steel such films afford protection to the underlying metal for a period of eight to ten months. However, after three to six months' outdoor exposure to sunlight, the film becomes definitely dark and this increases progressively with further exposure.

Films of the above lacquer over plain steel before exposure showed satisfactory adhesion after six hours' immersion in water, while similar compositions without the resin were entirely detached from the steel plate by the water.

As previously indicated, I greatly prefer to employ in my invention resins which are made from mononuclear monohydric phenols, of which p-tertiary-amyl phenol is the outstanding resin. One reason for this further selection is the ability of such resins to tolerate much larger proportions of the less expensive aliphatic hydrocarbon solvents. Another reason is their greater range of ethyl cellulose compatibility with a correspondingly wider range of possible formulations. Other suitable resins of this type are those made from p-tertiary butylphenol, 4-hydroxyphenyldimethylisobutylethane, 4-hydroxyphenylmethylethylpropylmethane, 4-hydroxyphenyldimethylisoamylmethane, etc.

Examples of polynuclear phenols having the two elements of chemical structure previously given are as follows: bis(3-methyl-4-hydroxyphenyl)dimethylmethane, bis(3-chloro-4-hydroxyphenyl)dimethylmethane, bis(3-methyl-4-hydroxyphenyl)methylethylmethane, bis(3-methyl-4-hydroxyphenyl)methylphenylmethane, bis(4-hydroxynaphthyl)dimethylmethane, 4-hydroxyphenyldimethylphenylmethane, bis(2-hydroxy-5-methylphenyl)dimethylmethane, bis(2-hydroxynaphthyl)dimethylmethane, etc.

Resins from the above phenols impart to the ethyl cellulose composition outstanding durability and color stability.

Resins which impart to ethyl cellulose compositions a moderately good durability may be prepared from p-phenyl phenol, p-cyclohexyl phenol, 1,1-bis(3-methyl-4-hydroxyphenyl) cyclohexane, 1,1-bis(3-methyl-4-hydroxyphenyl)-beta-naphthane, etc. Ethyl cellulose compositions containing such resins do not, however, have the color stability in particular of compositions containing resins from the phenols listed in the preceding paragraph.

I prefer aqueous formaldehyde for making the phenol-aldehyde resins which I employ in my invention. Related materials may be used with some success, however. Among these are paraformaldehyde, methylene chloride, hexamethylenetetramine, acetaldehyde, benzaldehyde, etc.

Many types of plasticizers may be used in compounding my ethyl cellulose compositions, as illustrated by the following: Mixed polycarboxylic acid esters of the higher aliphatic alcohols obtained by hydrogenation of carbon oxides, triphenyl thiophosphate, dibutyl phthalate, tricresyl phosphate, methoxyethyl butyl phthalate, dilauryl phthalate, dixylylethane, ethyl naphthenates, cyclohexyl butyl phthalate, etc.

I have also found that the chlorinated diphenyls (commonly known as "Aroclors") act as blending agents for the ethyl cellulose, resin, and plasticizer and impart improved water resistance and adhesion to the lacquer film. From 3-5 parts of chlorinated diphenyl may, for example, be added with advantage to the composition of Example I.

The ethyl cellulose, depending upon the viscosity desired for the lacquer, may be of various viscosities and various degrees of substitution. It is advisable, however, for reasons of solubility, to employ at least a monoethyl cellulose, that is, an ethyl cellulose having at least one ethyl radical for each glucose unit.

My new lacquers may contain if desired the usual lacquer ingredients such as rosin, ester gum, shellac, damar, copals, or synthetic resins other than the specified phenol-aldehyde resins; filling materials, pigments, extenders, "pearl essence" material, dyes, stabilizers, driers (for oil compositions), acid-absorbing materials, castor oil, etc.

The examples which have been given illustrate various proportions of phenol-aldehyde resin which may be used. When no other resin is present (as is usually the case) it is impractical as a rule to employ a ratio of resin to ethyl cellulose of less than 1 to 10 since quantities less than this will not impart adequate water resistance, adhesion, or good general durability to the film. On the other hand, the upper limit of this ratio is fixed only by the degree of compatibility of the resin with the ethyl cellulose. In the case of resins from many polynuclear phenols, as paraphenyl phenol, only about five parts resin can be used for 10 parts ethyl cellulose, larger amounts resulting in turbid and inferior lacquer films. When resins from such phenols as paratertiary-amyl phenol are employed, however, the amount of resin which may be used is unlimited, that is, it is compatible with ethyl cellulose in all proportions.

For that modification of my invention involving drying oil compositions I may employ one or more oils such as linseed, China-wood, oiticica, walnut, perilla, safflower, etc.

Ethyl cellulose compositions containing the types of phenol-aldehyde resins described herein may be used as molding plastics, to which the usual pigments, coloring materials and inert fillers may be added if desired. They also find use as coatings for fabrics, paper, textiles, etc. and as impregnants for absorbent structures or surfaces such as wood, cement, brick, ceramics, and the like. They are valuable as interlayers or adhesives therefore in making shatter-proof glass and other laminated products.

It will be evident from the foregoing description that my new compositions have the highly important technical advantages of outstanding durability and color stability. A method has been given for utilizing to greatest advantage in coatings and plastics the chemically inert cellulose ethers, in particular ethyl cellulose. Specifically, I have pointed out the few phenol-aldehyde resins suitable for preparing ethyl cellulose lacquers which, in durability, beauty, and color stability, equal or exceed the present extensively used nitrocellulose lacquers.

As many apparently widely different embodiments of this invention may be made without departing from the spirit and scope thereof, it is to be understood that I do not limit myself to the specific embodiments thereof except as defined in the appended claims.

I claim:

1. A lacquer comprising an ethyl cellulose having at least one ethyl group per glucose unit, a plasticizer therefor, a resin obtained by condensing formaldehyde with a phenol having two and only two unsubstituted positions ortho to phenolic hydroxyl and having a tertiary aliphatic carbon atom para to all phenolic hydroxyls, and at least one lacquer solvent capable of dissolving the ethyl cellulose, resin, and plasticizer, said lacquer yielding films which in durability and color retention are at least equal to those of nitrocellulose lacquers containing natural resins.

2. The lacquer set forth in claim 1 in which said phenol is para tertiary amyl phenol.

3. The lacquer set forth in claim 1 in which said phenol is bis(3-methyl-4-hydroxyphenyl)dimethylmethane.

RICHARD T. UBBEN.

CERTIFICATE OF CORRECTION.

Patent No. 2,075,376.   March 30, 1937.

RICHARD T. UBBEN.

It is hereby certified that error appears in the printed specification of the above numbered patent requiring correction as follows: Page 2, second column, line 25, after the word "steel" insert a comma; line 35, for "rosin-lycerol" read rosin-glycerol; line 48, for "pheno-formaldehyde" read phenol-formaldehyde; page 4, first column, line 51, for "dimethylisobutylethane" read dimethylisobutylmethane; and that the said Letters Patent should be read with these corrections therein that the same may conform to the record of the case in the Patent Office.

Signed and sealed this 1st day of June, A. D. 1937.

Henry Van Arsdale
Acting Commissioner of Patents.

(Seal)

It will be evident from the foregoing description that my new compositions have the highly important technical advantages of outstanding durability and color stability. A method has been given for utilizing to greatest advantage in coatings and plastics the chemically inert cellulose ethers, in particular ethyl cellulose. Specifically, I have pointed out the few phenol-aldehyde resins suitable for preparing ethyl cellulose lacquers which, in durability, beauty, and color stability, equal or exceed the present extensively used nitrocellulose lacquers.

As many apparently widely different embodiments of this invention may be made without departing from the spirit and scope thereof, it is to be understood that I do not limit myself to the specific embodiments thereof except as defined in the appended claims.

I claim:

1. A lacquer comprising an ethyl cellulose having at least one ethyl group per glucose unit, a plasticizer therefor, a resin obtained by condensing formaldehyde with a phenol having two and only two unsubstituted positions ortho to phenolic hydroxyl and having a tertiary aliphatic carbon atom para to all phenolic hydroxyls, and at least one lacquer solvent capable of dissolving the ethyl cellulose, resin, and plasticizer, said lacquer yielding films which in durability and color retention are at least equal to those of nitrocellulose lacquers containing natural resins.

2. The lacquer set forth in claim 1 in which said phenol is para tertiary amyl phenol.

3. The lacquer set forth in claim 1 in which said phenol is bis(3-methyl-4-hydroxyphenyl)dimethylmethane.

RICHARD T. UBBEN.

CERTIFICATE OF CORRECTION.

Patent No. 2,075,376.  March 30, 1937.

RICHARD T. UBBEN.

It is hereby certified that error appears in the printed specification of the above numbered patent requiring correction as follows: Page 2, second column, line 25, after the word "steel" insert a comma; line 35, for "rosin-lycerol" read rosin-glycerol; line 48, for "pheno-formaldehyde" read phenol-formaldehyde; page 4, first column, line 51, for "dimethylisobutylethane" read dimethylisobutylmethane; and that the said Letters Patent should be read with these corrections therein that the same may conform to the record of the case in the Patent Office.

Signed and sealed this 1st day of June, A. D. 1937.

Henry Van Arsdale
Acting Commissioner of Patents.

(Seal)

CERTIFICATE OF CORRECTION.

Patent No. 2,075,376. March 30, 1937.

RICHARD T. UBBEN.

It is hereby certified that error appears in the printed specification of the above numbered patent requiring correction as follows: Page 2, second column, line 25, after the word "steel" insert a comma; line 35, for "rosin-lycerol" read rosin-glycerol; line 48, for "pheno-formaldehyde" read phenol-formaldehyde; page 4, first column, line 51, for "dimethylisobutylethane" read dimethylisobutylmethane; and that the said Letters Patent should be read with these corrections therein that the same may conform to the record of the case in the Patent Office.

Signed and sealed this 1st day of June, A. D. 1937.

(Seal)

Henry Van Arsdale
Acting Commissioner of Patents.